United States Patent Office 2,728,069
Patented Dec. 20, 1955

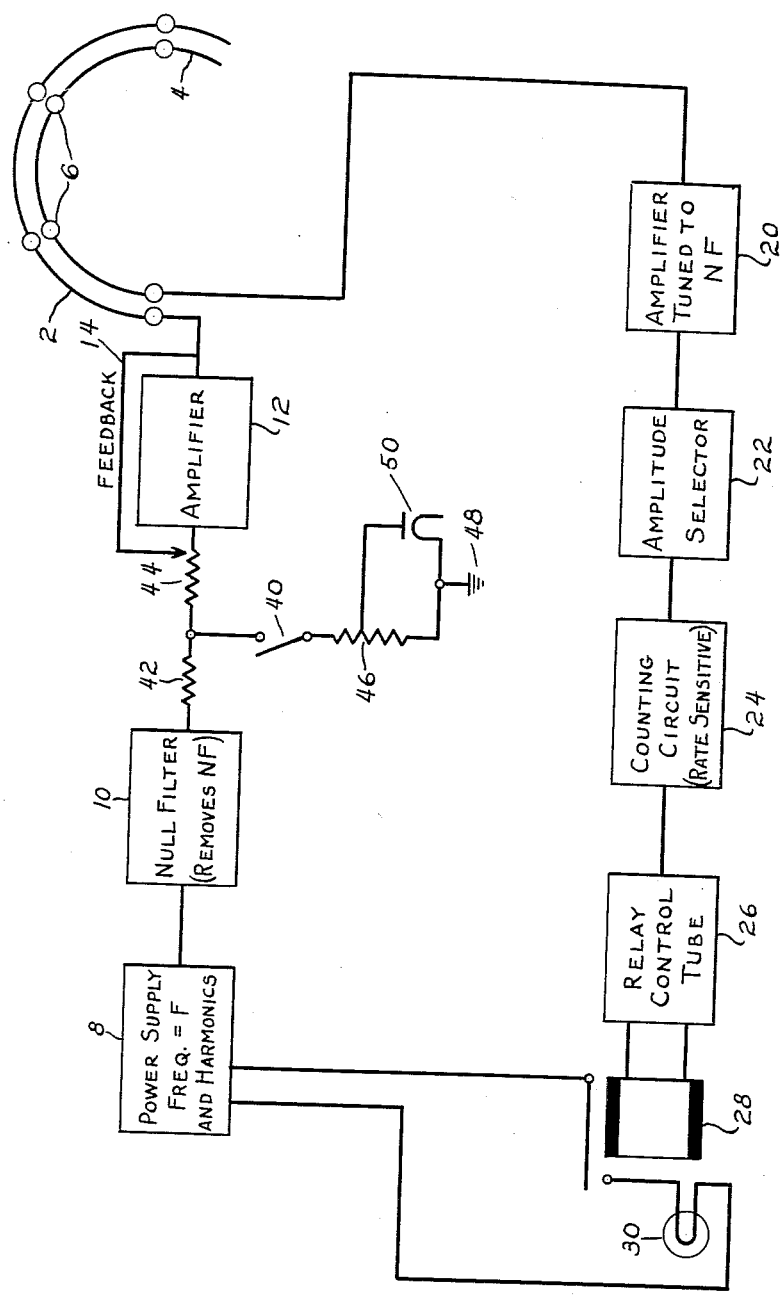

2,728,069
TEST CIRCUIT FOR FLAME DETECTOR SYSTEM

Mahlon H. Norton, Paterson, N. J., assignor to Petcar Research Corporation, Belleville, N. J., a corporation of New Jersey Continuation of application Serial No. 362,084, June 16, 1953. This application July 23, 1953, Serial No. 369,772

3 Claims. (Cl. 340—227)

This application is a continuation of my co-pending application Serial No. 362,084, filed June 16, 1953.

This invention relates to flame-detection systems of the type in which a signal is produced when two electrodes forming part of the system are bridged by a flame. Such a system is disclosed in my co-pending application Serial No. 369,917 and the present invention is particularly designed and intended for use with that system although it may be used with, or form part of, any detection system including two or more electrodes which are bridged by a flame to produce the signal indication.

The flame-detecting system provided by the invention of my co-pending application comprises two spaced wires which are led in parallel, closely spaced relation through the space which is to be monitored. A source of alternating voltage is connected to one wire, which is known and referred to hereinafter as the transmitting wire, and develops between this wire and ground an alternating voltage from which one harmonic of the frequency produced by the source is attenuated, it being understood that in the invention disclosed in my co-pending application the harmonic which is attenuated is a full-numbered harmonic which is neither the zero harmonic nor the basic frequency itself. The second wire, which is known and referred to hereinafter as the receiving wire, is connected to receiving means which is tuned to receive only that harmonic of the frequency produced by the source which has been attenuated in the voltage developed between the transmitting wire and ground. In the absence of a flame bridging the two wires, the energy supplied to the transmitting wire causes a field to be established about the two wires which normally is not received by the receiving means connected to the receiving wire because of the selective tuning thereof. However, a flame bridging the two wires causes immediate generation of the missing harmonic frequency in the output circuit of the receiving wire, thus developing energy which may be utilized to energize indicating means.

In the operation of such a flame-detecting system as that described above, it is necessary to know, or be able to know, at all times whether the system is operative and by the present invention I have provided a simple and effective system or device for association with such a flame detecting system, which is operative at any time to provide an indication whether the entire flame detecting system is operable in the intended and designed manner.

An embodiment of the invention is described in the following specification and illustrated in the accompanying drawing, which is partly a schematic diagram and partly a circuit diagram showing a flame detector system having associated with it a test circuit according to the present invention.

A schematic diagram of a flame detecting system constructed and operable in accordance with the invention of my co-pending application and including test means in accordance with the present invention, is disclosed in the drawings and comprises a transmitting electrode 2 and a receiving electrode 4 which, in the disclosed embodiment take the form of elongated, bare wires which are mounted in closely spaced relation on insulator supports 6 and are trained through the space to be monitored, which may be the engine zone of an aircraft engine nacelle. A source of alternating voltage 8 is connected to the transmitting wire 2 through a null filter 10 which eliminates from the energy supplied to the wire 2 one harmonic of the frequency generated by the source, and an amplifier 12, thus causing an alternating voltage to be developed between the wire 2 and ground having all of the basic and harmonic frequencies produced by the source 8 but with a negligible quantity of the harmonic frequency attenuated by filter 10. The receiving wire 4 is connected through amplifier 20, amplitude selector 22, counting rate circuit 24 and relay control tube 26 to a relay 28 which is operable, when energized, to close the circuit through an indicating device such as lamp 30.

The test circuit provided by this invention comprises a normally open two-contact switch 40, one terminal of which is connected through resistors 42, 44 to the output of the null filter 10 and the input of amplifier 12, and the other terminal of which is connected to one terminal of a potentiometer 46, the other terminal of which is grounded at 48. The contact arm of the potentiometer is connected to one element of a diode device 50 which may be a vacuum tube, semi-conductor device, transistor or the like, the other element of which is grounded at 48.

In the normal operation of the flame detector system, an harmonic of the basic frequency of the source 8 is attenuated from the energy supplied to the amplifier 12 and transmitting wire 2. If the test switch 40 is closed this energy, without the attenuated harmonic, will be supplied through the potentiometer 46 to the diode device 50 and rectification will take place and will be partial or complete, depending on the setting of the contact arm of the potentiometer. This rectification will supply to the transmitting wire a controllable amount of the previously attenuated harmonic of the basic frequency and as the output circuitry of the receiving wire is tuned to receive only energy having the attenuated harmonic frequency, and as there is a measurable capacitance between the transmitting and receiving wires, the output circuitry of the receiving wire will be energized and the indicator 30 will be operated in the usual and described manner, thus providing an indication that the system is operative in its intended manner.

While I have described and illustrated one form which my invention may take, it will be apparent to those skilled in the art to which it relates that other embodiments, as well as modifications of that disclosed, may be made and practised without departing in any way from the spirit or scope of the invention, for the limits of which reference must be had to the appended claims.

What is claimed is:

1. An electrical flame detecting system comprising electrode means positioned within a space to be monitored for flame and insulated from ground, means for developing in said electrode means an alternating voltage of a known fundamental frequency containing known measurable harmonics from which at least one harmonic of the fundamental frequency has been attenuated to negligible value, which attenuated harmonic is neither the zero nor first harmonic of the fundamental frequency, receiving means coupled to said electrode means which is responsive only to the attenuated harmonic of the fundamental frequency, means for indicating reception of said attenuated harmonic, means connected between said electrode means and ground for supplying electrical energy at the frequency of the attenuated harmonic to said electrode means, and means for disconnecting said last-named means from the electrode means.

2. An electrical flame detecting system comprising two spaced electrodes positioned within a space to be monitored and adapted to be bridged by a flame, means for developing between one electrode and ground an alternating voltage of a known fundamental frequency containing known measurable harmonics from which at least one harmonic of the fundamental frequency has been attenuated to negligible value which is neither the zero nor first harmonic of the fundamental frequency, receiving means connected between the second electrode and ground which is responsive only to the attenuated harmonic of the fundamental frequency, means for indicating reception of said attenuated harmonic or harmonics, means connected between the first named electrode and ground for supplying electrical energy at the frequency of the attenuated harmonic to the first electrode, and means for disconnecting said last-named means from the first electrode.

3. An electrical flame detecting system comprising two spaced electrodes positioned within a space to be monitored and adapted to be bridged by a flame, means for developing between one electrode and ground an alternating voltage of a known fundamental frequency containing known measurable harmonics from which at least one harmonic of the fundamental frequency has been attenuated to negligible value, which is neither the zero nor first harmonic of the fundamental frequency, receiving means connected between the second electrode and ground which is responsive only to the attenuated harmonic or harmonics of the fundamental frequency, means for indicating reception of said attenuated harmonic or harmonics, rectifying means having one element thereof grounded, a potentiometer connected between ground and said first electrode and having its contact arm connected to the second element of said rectifying means, and a normally open switch in circuit between the potentiometer and the first electrode for connecting the same when operated to closed position to cause energy at the frequency of the attenuated harmonic to be supplied to said electrode.

References Cited in the file of this patent
UNITED STATES PATENTS
2,580,539    Goodwin ---------------- Jan. 1, 1952